United States Patent
Cachin et al.

(10) Patent No.: US 10,754,970 B2
(45) Date of Patent: *Aug. 25, 2020

(54) DATA MASKING

(71) Applicant: International Business Machines Corporation, Armonk, NY (US)

(72) Inventors: Christian Cachin, Thalwil (CH); Jan L. Camenisch, Thalwil (CH); Eduarda Freire Stögbuchner, Rueschlikon (CH); Anja Lehmann, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 599 days.

This patent is subject to a terminal disclaimer.

(21) Appl. No.: 15/417,851

(22) Filed: Jan. 27, 2017

(65) Prior Publication Data

US 2018/0218164 A1 Aug. 2, 2018

(51) Int. Cl.
*G06F 21/60* (2013.01)
*G06F 21/62* (2013.01)
(Continued)

(52) U.S. Cl.
CPC ........ *G06F 21/6218* (2013.01); *G06F 21/602* (2013.01); *G06F 21/6254* (2013.01);
(Continued)

(58) Field of Classification Search
CPC ............................ H04L 9/0891; H04W 12/04; H04W 12/0401; H04W 12/04033
See application file for complete search history.

(56) References Cited

U.S. PATENT DOCUMENTS 6,792,111 B1   9/2004   Italia et al.
8,271,747 B2   9/2012   Lai
(Continued)

FOREIGN PATENT DOCUMENTS

CN   106126220 A   11/2016
CN   106156650 A   11/2016
WO   2013136324 A1   9/2013

OTHER PUBLICATIONS

Otey, "Using SQL Server 2016's New Dynamic Data Masking", SQL Server Pro, Jun. 2016, http://sqlmag.com/scaling-success-sql-server-2016/using-sql-server-2016-s-new-dynamic-data-masking, 2 pages.
(Continued)

*Primary Examiner* — Ponnoreay Pich
(74) *Attorney, Agent, or Firm* — Cantor Colburn LLP; Daniel Morris

(57) ABSTRACT

Data masking is provided by, for at least one predetermined data item in data to be sent, applying a one-way function to that data item to produce a first value, producing a masked data item by encrypting the first value via a deterministic encryption scheme using a current encryption key for a current epoch, and replacing that data item by the masked data item. A data-provider computer sends the masked data to the data-user computer. On expiry of the current epoch, the data-provider computer generates a new encryption key for the encryption scheme in a new epoch, produces mask-update data, dependent on the current and new encryption keys, and sends the mask-update data to the data-user computer. The mask-update data permits updating, at the data-user computer, of masked data items produced with the current encryption key into masked data items produced with the new encryption key.

9 Claims, 4 Drawing Sheets

(51) Int. Cl.
*H04L 9/06* (2006.01)
*H04L 9/08* (2006.01)

(52) U.S. Cl.
CPC .............. *H04L 9/06* (2013.01); *H04L 9/0643* (2013.01); *H04L 9/0891* (2013.01); *H04L 2209/04* (2013.01)

(56) References Cited

U.S. PATENT DOCUMENTS

| | | | |
|---|---|---|---|
| 8,726,139 B2 | 5/2014 | O'Connor et al. | |
| 8,817,988 B1* | 8/2014 | Stockton | H04L 9/0891 |
| | | | 380/277 |
| 9,378,649 B2* | 6/2016 | Kanzaki | G09B 7/02 |
| 10,148,430 B1* | 12/2018 | Roth | H04L 9/0819 |
| 2002/0041684 A1* | 4/2002 | Nishioka | H04L 9/3013 |
| | | | 380/30 |
| 2002/0174366 A1* | 11/2002 | Peterka | H04N 7/165 |
| | | | 726/4 |
| 2007/0230707 A1* | 10/2007 | Blom | H04L 63/062 |
| | | | 380/277 |
| 2011/0113050 A1* | 5/2011 | Youn | G06F 21/6218 |
| | | | 707/757 |
| 2014/0115387 A1* | 4/2014 | Vas | H04L 63/06 |
| | | | 714/15 |
| 2014/0164405 A1* | 6/2014 | Tsai | G06F 21/6227 |
| | | | 707/754 |
| 2015/0067886 A1* | 3/2015 | Maman | G06F 21/6227 |
| | | | 726/27 |
| 2016/0239666 A1* | 8/2016 | Obukhov | H04L 9/0618 |
| 2016/0335450 A1* | 11/2016 | Yoshino | H04L 9/008 |
| 2017/0222800 A1* | 8/2017 | Haber | H04L 9/0861 |
| 2018/0218166 A1* | 8/2018 | Cachin | H04L 9/0643 |

OTHER PUBLICATIONS

Cachin et al., "Data Masking," U.S. Appl. No. 15/800,282, filed Nov. 1, 2017.
List of IBM Patents or Patent Applications Treated as Related; Date Filed: Jan. 27, 2017, 2 pages.
Cachin et al., "Data Masking," U.S. Appl. No. 16/693,934, filed Nov. 25, 2019.
List of IBM Patents or Patent Applications Treated as Related; Date Filed: Nov. 26, 2019, 2 pages.

* cited by examiner

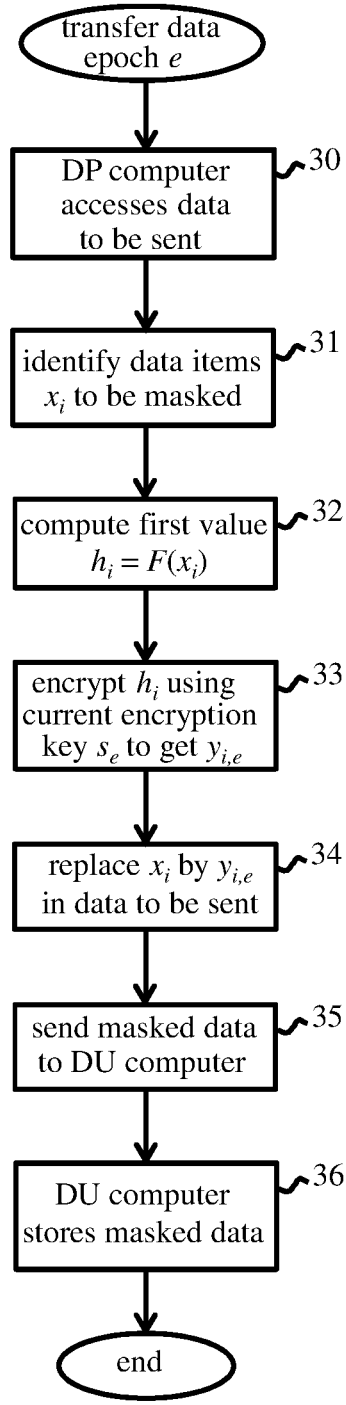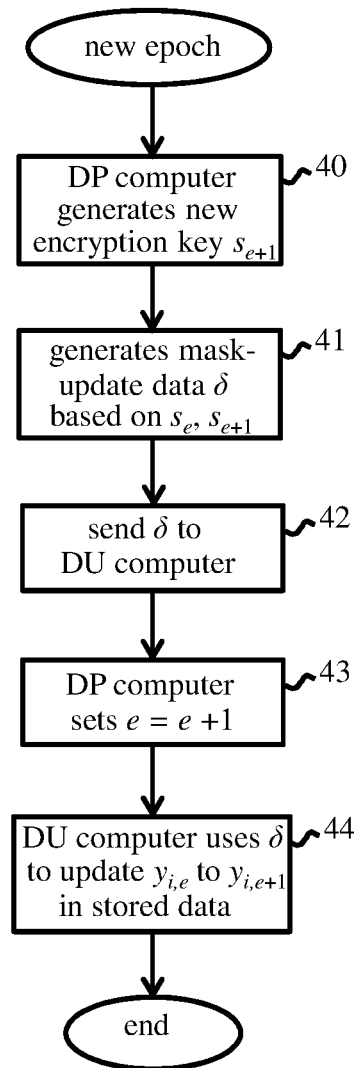
Figure 3
Figure 4

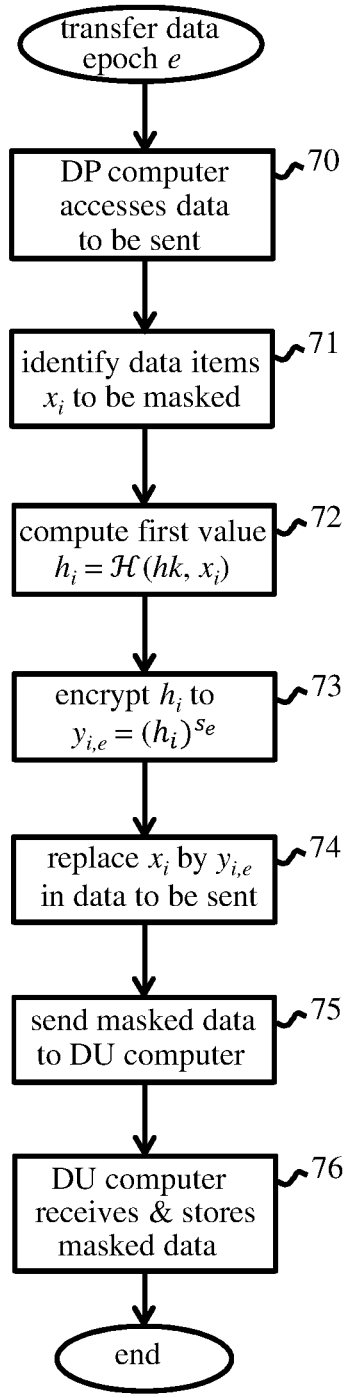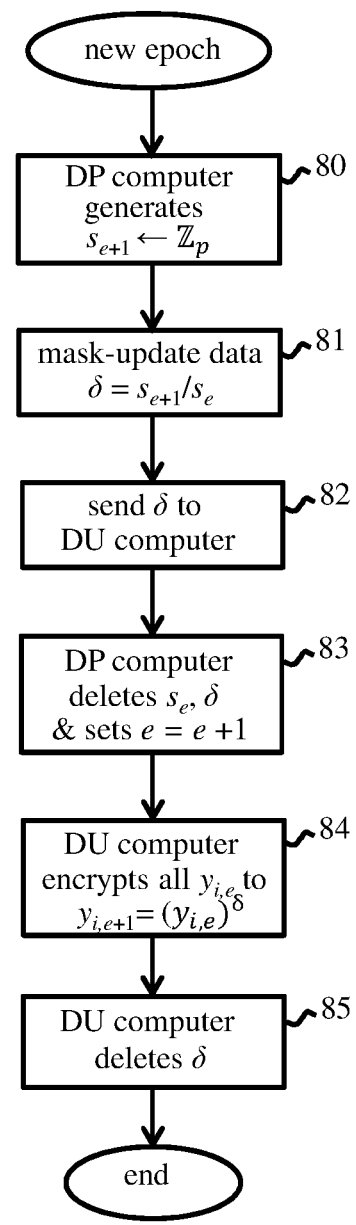
Figure 7                    Figure 8

DATA MASKING

BACKGROUND

The present invention relates generally to data masking, and more particularly to methods, apparatus and computer program products whereby data is masked at a data provider computer and sent to a (untrusted) data-user computer.

Data masking is a process used when data which includes sensitive information needs to be copied to a less-trusted environment. The purpose of data masking is to de-sensitize the data, so as to hide (or "mask") sensitive data items, such that the data as a whole remains useful for its intended purpose. For example, a data set may contain information such as social-security numbers, passport data, credit card numbers, health-record details, etc., which should not be leaked to untrusted parties. Typical application scenarios include sending out a data set for statistical analysis, running an application in a testing environment with a realistic workload, collecting service-quality information from customers, and transaction processing. Concerns about data privacy have grown in recent years along with a trend of moving services to third parties and into the cloud. Masking inhibits exposure of sensitive data in untrusted environments and addresses legal issues associated with moving data across borders.

For security, a data masking process should be such that a masked data item does not reveal information about the original, unmasked data. However, usability requires that a masked data set preserves referential integrity. That is, when the same data item occurs multiple times in the unmasked data set, it should be mapped consistently to the same masked value.

Many data masking techniques have been proposed and are in commercial operation today. For example, masking can be performed via hashing. Here, a data item is hashed together with a long-term hash key of the data-provider. The data item is then replaced with the resulting hash value in the masked data sent to the user. Other known methods are based on substitution, shuffling, deletion ("nulling"), obfuscation, or perturbation techniques. However, such methods cannot provide the increasingly-stringent guarantees required for data security. Moreover, these methods do not allow for re-keying of masked data. The relation between a given data item and its masked form never changes and keys used for masking cannot be changed. With hashing, for example, the hash key cannot be changed without breaking referential integrity. For security-critical environments, e.g., financial institutions, regular re-keying operations and periodic updates of the relationship between unmasked and masked data are required. Periodic updates also reduce the risk of exposure when data leaks gradually over time. As masked data sets are often large, performing such an update from scratch, with the data-provider re-masking the complete data set with a fresh key and re-sending to the user, would be highly inefficient.

SUMMARY

According to embodiments of the present invention there is provided a computer-implemented method for data masking at a data-provider computer. The method comprises accessing data to be sent to a data-user computer, and producing masked data by, for at least one predetermined data item in the data to be sent, applying a one-way function to that data item to produce a first value, producing a masked data item by encrypting the first value via a deterministic encryption scheme using a current encryption key for a current epoch, and replacing that data item by the masked data item. The method includes sending the masked data to the data-user computer, and, on expiry of the current epoch, generating a new encryption key for the encryption scheme in a new epoch, producing mask-update data, dependent on the current and new encryption keys, and sending the mask-update data to the data-user computer. The mask-update data permits updating, at the data-user computer, of masked data items produced with the current encryption key into masked data items produced with the new encryption key.

Embodiments of this invention provide secure data masking methods in which masking keys can be updated and masked data can be re-keyed while preserving referential integrity. The re-keying operation to update previously-masked data can be performed by the data user, in an untrusted domain, without compromising security of the masked data.

Embodiments of the invention may be used in a static data masking scenario, where all data required by the user (e.g. an entire database or other complete data set) is masked and sent to the user in one go. However, methods embodying the invention are also highly advantageous in dynamic data masking scenarios. In a dynamic data masking scenario, data is masked and sent to the user as required, e.g. in response to a series of access requests from the user. Data can be masked "on-the-fly" and sent to the user on demand In both scenarios, data masked and sent during the current epoch can be re-keyed for a new epoch using the mask-update data sent by the data-provider. The steps of generating the new encryption key, producing the mask-update data, and sending the mask-update data to the data-user computer, can be performed on expiry of each of that new epoch and subsequent new epochs, whereby masked data can be repeatedly re-keyed for each successive epoch. In a dynamic scenario, the new encryption key for each new epoch can be used as the current encryption key in the data masking step for masking further data sent out in that epoch. In particular, during each of (at least some of) the new epochs, the data provider computer may access further data to be sent to the data-user computer, and perform, for that further data, the step of producing masked data using the new encryption key as the current encryption key for that epoch. The further masked data can then be sent to the data-user computer. Since the re-keying operation, using the mask-update data, converts masked data items produced with a current encryption key into masked data items produced with the new encryption key, referential integrity is preserved between masked data sent out in previous epochs and any further data masked using the new encryption key for any given epoch.

In the data masking step of preferred embodiments, the first value corresponding to a data item is produced by applying the one-way function to that data item and a secret key of the data provider computer. Use of the secret key in this first layer of the masking process offers additional security against data exposure. The second, encryption layer of the masking process, and the associated mask-update data, can be constructed in different ways to provide different security guarantees according to security of the underlying cryptography. In some embodiments, the encryption scheme may comprise a symmetric encryption scheme and the mask-update data may comprise the current encryption key and the new encryption key. Here, the data-user can re-key previously-received data by decrypting each masked data item, using the current encryption key, via a decryption algorithm of the encryption scheme to obtain the first value, and re-encrypting the first value via the encryption scheme using the new encryption key. This offers a sufficiently-high level of security for many applications.

In some embodiments, the mask-update data comprises a predetermined function δ of the current and new encryption keys, and the encryption scheme comprises an algorithm Enc(k, X) for encrypting a value X under an encryption key k such that Enc(δ, (Enc($s_e$, X))=Enc($s_{e+1}$, X), where $s_e$ is the current encryption key and $s_{e+1}$ is the new encryption key. Here, the data-user can re-key previously-received data by encrypting each masked data item via the encryption algorithm Enc(k, X) using the encryption key k=δ. This offers exceptional security in that the re-masking process does not even expose the originally-encrypted first value for a data item. In an efficient implementation of such a scheme, the algorithm Enc(k, X)=$X^k$ and δ=$s_{e+1}/s_e$.

Embodiments of the invention provide a computer-implemented method for managing masked data at a data-user computer. The method comprises receiving masked data from a data-provider computer, where the masked data contains at least one masked data item produced by applying a one-way function to a data item to produce a first value and encrypting the first value via a deterministic encryption scheme using a current encryption key for a current epoch, and then storing the masked data. The method further includes, on expiry of the current epoch, receiving from the data-provider computer mask-update data which is dependent on the current encryption key and a new encryption key for the encryption scheme in a new epoch. The mask-update data is used to update each masked data item, which was produced with the current encryption key, in the stored masked data into a masked data item produced with the new encryption key.

Embodiments of the invention provide computer program products each comprising a computer readable storage medium embodying program instructions executable by a data-provider computer, or a data-user computer, to cause that computer to perform a method as described above. At least one additional embodiment provides a system comprising a data-provider computer and a data-user computer adapted to implement methods described above.

Embodiments of the invention will be described in more detail below, by way of illustrative and non-limiting example, with reference to the accompanying drawings.

BRIEF DESCRIPTION OF THE DRAWINGS

FIG. 3 indicates steps performed in system 1 in operation of a data masking scheme;

FIG. 4 further indicates steps performed in system 1 in operation of a data masking scheme;

FIG. 7 indicates more detailed steps performed in another embodiment of the data masking system; and FIG. 8 further indicates more detailed steps performed in another embodiment of the data masking system.

DETAILED DESCRIPTION

Figure 1:
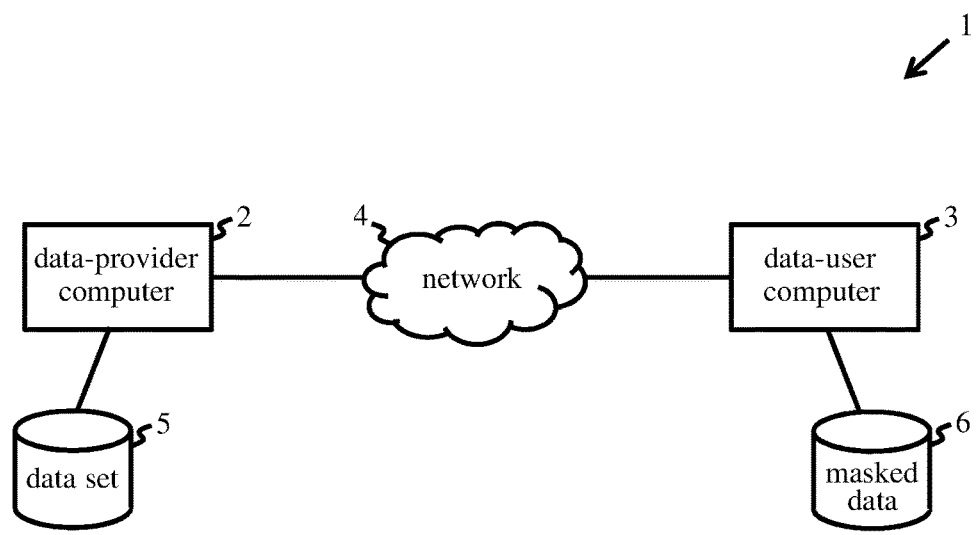
FIG. 1 is a schematic representation of a system for implementing data masking schemes embodying the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The system 1 shown in FIG. 1 comprises a data-provider computer 2 and a data-user computer 3 which are operable for communication via a network 4 (where network 4 may in general comprise one or more component networks and/or internetworks including the Internet). Data-provider (DP) computer 2 has access to a data set in storage, represented here by database 5, operatively coupled to DP computer 2. Database 5 contains data to be sent to the data-user (DU) computer 3 in operation. DP computer 2 implements a dynamic data masking process whereby data can be accessed, masked and sent to DU computer 3 as required. In particular, the data to be sent to DU computer 3 at any given time may contain certain data items which must be masked before the data is sent out. Such data items are predetermined at DP computer 2 and may be defined in any convenient manner, e.g. by type, category, nature, location, etc., of the data in question. For example, DP computer 2 may implement a set of masking rules which determines the data items to be masked. Individual data items may comprise, for instance, data fields or portions (e.g. bytes) thereof or any other defined unit of data. However, the particular data items and the masking criteria applied are orthogonal to masking schemes described herein. DU computer 3 receives the masked data via network 4 and stores the masked data in storage, represented here by database 6, operatively coupled to DU computer 3. DU computer 3 further manages masked data stored in database 6 as described below.

The masking scheme implemented in system 1 operates in successive periods of time, or "epochs". Briefly, in any given epoch e, data sent out by DP computer 2 is masked using a masking key $k_e$ for that epoch. On expiry of any epoch e, a new masking key $k_{e+1}$ is generated for the new epoch at DP computer 2. Masked data previously sent out is also re-keyed at DU computer 3 for consistency with the new masking key. The re-keying operation uses mask-update data provided by DP computer 2 as described further below.

The epochs may be defined in system 1 in various ways and different epochs may have fixed or variable durations. For example, new epochs may be initiated periodically at regular intervals, the term of which may be set as desired. A new epoch may also be initiated in response to some event, e.g. detection of malicious intervention in the system.

DP computer 2 may be operated by a data owner and the data set 5 may comprise proprietary data stored by the data owner. Alternatively, DP computer 2 may be operated by an entity entrusted to perform data masking on behalf of the data owner. In general, therefore, data sets to be masked may be stored in storage apparatus local to DP computer 2, or stored in remote storage apparatus accessible to DP computer 2, for example via communication over a network with another computer (e.g. a data owner computer).

Data storage 5, 6 may in general comprise any convenient data storage apparatus including one or more data storage media. Typical implementations comprise disk storage apparatus comprising one or more disks, such as magnetic or optical disks, which may be internal to a computer, e.g. in a hard disk drive, or provided by externally-accessible disk apparatus, e.g. in a disk drive array such as a RAID array.

Each of DP computer 2 and DU computer 3 may be implemented by a general- or special-purpose computer, which may comprise one or more (real or virtual) machines, providing functionality for implementing the operations described herein. This functionality may be provided by logic implemented in hardware or software or a combination thereof. Such logic may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices.

Figure 2:
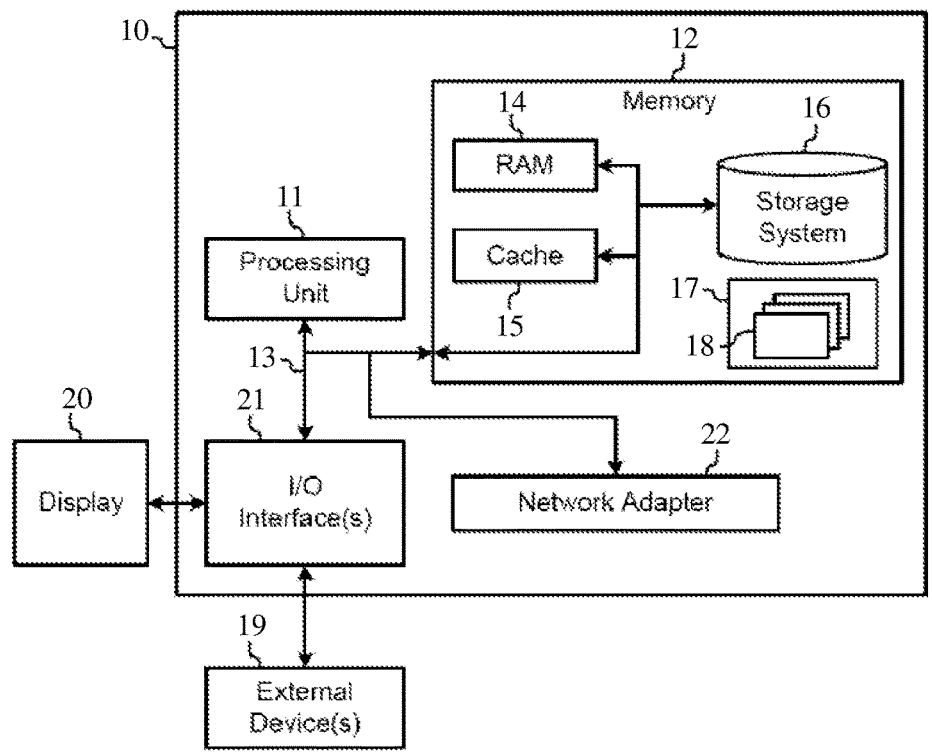
FIG. 2 is a generalized schematic of a computer in the FIG. 1 system.

The block diagram of FIG. 2 shows an exemplary computing apparatus for implementing a computer 2, 3 of system 1. The apparatus is shown here in the form of a general-purpose computing device 10. The components of computer 10 may include processing apparatus such as one or more processors represented by processing unit 11, a system memory 12, and a bus 13 that couples various system components including system memory 12 to processing unit 11.

Bus 13 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 10 typically includes a variety of computer readable media. Such media may be any available media that is accessible by computer 10 including volatile and non-volatile media, and removable and non-removable media. For example, system memory 12 can include computer readable media in the form of volatile memory, such as random access memory (RAM) 14 and/or cache memory 15. Computer 10 may further include other removable/non-removable, volatile/non-volatile computer system storage media. By way of example only, storage system 16 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 13 by one or more data media interfaces.

Memory 12 may include at least one program product having one or more program modules that are configured to carry out functions of embodiments of the invention. By way of example, program/utility 17, having a set (at least one) of program modules 18, may be stored in memory 12, as well as an operating system, one or more application programs, other program modules, and program data. Each of the operating system, one or more application programs, other program modules, and program data, or some combination thereof, may include an implementation of a networking environment. Program modules 18 generally carry out the functions and/or methodologies of embodiments of the invention as described herein.

Computer 10 may also communicate with: one or more external devices 19 such as a keyboard, a pointing device, a display 20, etc.; one or more devices that enable a user to interact with computer 10; and/or any devices (e.g., network card, modem, etc.) that enable computer 10 to communicate with one or more other computing devices. Such communication can occur via Input/Output (I/O) interfaces 21. Also, computer 10 can communicate with one or more networks such as a local area network (LAN), a general wide area network (WAN), and/or a public network (e.g., the Internet) via network adapter 22. As depicted, network adapter 22 communicates with the other components of computer 10 via bus 13. It should be understood that although not shown, other hardware and/or software components could be used in conjunction with computer 10. Examples include, but are not limited to: microcode, device drivers, redundant processing units, external disk drive arrays, RAID systems, tape drives, and data archival storage systems, etc.

In a set-up procedure prior to operation of system 1, the DP computer 2 generates the first masking key $k_0$ for the first epoch e=0. In the embodiments to be described, the masking key $k_e$ for each epoch e comprises (at least) an encryption key $s_e$ for a deterministic encryption scheme ENC. (A deterministic encryption scheme is a scheme in which the encryption algorithm Enc(k, X) for encrypting a plaintext message X under a key k always produces the same ciphertext for the same key k and plaintext X). FIGS. 3 and 4 indicate basic steps of the dynamic data masking scheme in subsequent operation of system 1.

FIG. 3 indicates steps performed for data transfer between DP computer 2 and DU computer 3 in a current epoch e. In step 30, DP computer 2 accesses data to be sent to DU computer 2. The data to be supplied may be determined in various ways, e.g. as part of an original data set to be sent out for processing, or in response to a data request from DU computer 3, or as new data becomes available in database 5, and so on. In any case, DP computer 2 accesses database 5 to retrieve the required data. In step 31, the DP computer identifies any data items, denoted here by $x_i$, in the data to be sent which must be masked in accordance with the masking criteria discussed earlier. Assuming the data contains at least one of these predetermined data items $x_i$, the DP computer then produces masked data via the process of steps 32 to 34. In particular, for each data item $x_i$, in step 32 the DP computer 2 applies a one-way function, denoted here by F, to (at least) that data item $x_i$ to produce a first value, denoted by $h_i$. (As is well known in the art, a one-way function is a function which is hard to invert. That is, when applied to an input X, the function produces an output Y such that it is hard (i.e. computationally infeasible) to guess X given Y.) In step 33, the DP computer then produces a masked data item $y_{i,e}$ by encrypting the first value $h_i$ via the deterministic encryption scheme ENC using the current encryption key $s_e$ for the current epoch e. In step 34, DP computer 2 replaces the original data item $x_i$ by the corresponding masked data item $y_{i,e}$ in the data to be sent. In step 35, DP computer 2 then sends the resulting masked data (which may contain both masked and unmasked data items) to DU computer 3 via network 4. In response to receipt of the masked data in step 36, the DU computer stores the masked data in database 6, and the data transfer is complete.

FIG. 4 indicates steps performed in system 1 on expiry of the current epoch e. In step 40, DP computer 2 generates a new encryption key $s_{e+1}$ for the encryption scheme ENC in the new epoch (e+1). In step 41, DP computer 2 produces mask-update data, denoted here by δ. The mask-update data δ is dependent on the current and new encryption keys $s_e$, $s_{e+1}$ and permits updating, at DU computer 3, of masked data items $y_{i,e}$ produced with the current encryption key $s_e$ into masked data items $y_{i,e+1}$ produced with the new encryption key $s_{e+1}$. DP computer 2 sends the mask-update data δ to DU computer 3 in step 42, and updates the epoch counter e to (e+1) in step 43. The new encryption key $s_{e+1}$ thus becomes the current encryption key $s_e$ for further data transfer in the new current epoch. In response to receipt of the mask-update data δ in step 44, the DU computer 3 uses the mask-update data to re-key the masked data stored in database 6. In particular, DU computer 3 uses the mask-update data δ to update each masked data item $y_{i,e}$ (produced with the old current encryption key $s_e$) in the stored masked data into a masked data item $y_{i,e+1}$ produced with the new current encryption key $s_{e+1}$. The update process is then complete.

The FIG. 4 process is performed again on expiry of the new epoch and each subsequent new epoch, whereby the encryption key $s_e$ is updated for each new epoch, and masked data already sent to DU computer 3 is re-keyed using the mask-update data δ for consistency with the new encryption key. Any further data sent to DU computer 3 in a new epoch is transferred via the process of FIG. 3 using the new encryption key as the current encryption key for that epoch.

It will be seen that the masking process comprises two layers: a static, inner layer using the one-way function F, and an epoch-specific outer layer using deterministic encryption. This allows the masking key to be updated, and masked data to be re-keyed for each new epoch, without exposing the original, unmasked data items $x_i$. The masking process is irreversible: a masked value $y_{i,e}$ does not reveal information about the original data $x_i$ (even if the encryption key $s_e$ is disclosed). The re-keying operation can be performed by the untrusted DU computer in step 44, and ensures that referential integrity is preserved between masked data sent out in previous epochs and any further data masked using the new encryption key for a given epoch. The scheme thus provides dynamic data masking with key evolution, in which key exposure does not disclose relations among data masked in the past, and where re-keying updates to previously masked data can be performed by an untrusted entity.

An implementation of the above scheme can be formalized as follows.

Key-Evolving Dynamic Data Masking. The key-evolving dynamic data masking scheme DDM consists of a data space $\mathcal{X}$, a masked space $\mathcal{Y}$, and a set of polynomial-time algorithms DDM.setup, DDM.next, DDM.mask, and DDM.upd satisfying the following conditions.

DDM.setup. The algorithm DDM.setup is a probabilistic algorithm run by the data-provider. On input a security parameter λ this algorithm returns par, a set of system parameters, and $k_0$, a masking key for epoch e=0. That is, (par, $k_0$) $\xleftarrow{r}$ DDM.setup (λ), where r signifies that the algorithm is probabilistic.

DDM.next. This probabilistic algorithm is also run by the data-provider. On input par, an epoch e≥0 and a masking key $k_e$ for that epoch, it outputs a masking key $k_{e+1}$ and a mask-update value $\delta_{e+1}$ for epoch e+1. That is, $(k_{e+1}, \delta_{e+1})$ $\xleftarrow{r}$ DDM.next (par, e, $k_e$).

DDM.mask. This is a deterministic injective algorithm run by the data-provider. Given the system parameters par, some input data x∈$\mathcal{X}$, an epoch e and its corresponding masking key $k_e$, the algorithm outputs a masked value $y_e$∈$\mathcal{Y}$. That is, $y_e$←DDM.mask(par, x, e, $k_e$).

DDM.upd. This deterministic algorithm is run by the data-user and uses the mask-update value. On input masked data $y_e$ from epoch e and the mask-update value $\delta_{e+1}$, DDM.upd updates $y_e$ to $y_{e+1}$, that is, $y_{e+1}$←DDM.upd($y_e$, $\delta_{e+1}$).

Exemplary embodiments of the above scheme described in detail below. Some preliminaries are described first.

Deterministic Symmetric Encryption. A symmetric encryption scheme SE consists of a key space $\mathcal{K}$ and three polynomial-time algorithms SE.KeyGen, SE.Enc, SE.Dec satisfying the following conditions.

SE.KeyGen. The key generation algorithm SE.KeyGen is a probabilistic algorithm that takes as input a security parameter λ and produces an encryption key s∈$\mathcal{K}$. That is, s $\xleftarrow{r}$ SE.KeyGen(λ).

SE.Enc. The deterministic encryption algorithm takes a key s∈$\mathcal{K}$ and a message m∈$\mathcal{M}$, where $\mathcal{M}$ is the message space, and returns a ciphertext C. We write C←SE.Enc(s, m) for the operation of executing SE.Enc on s and m, letting C denote the output ciphertext.

SE.Dec. The deterministic decryption algorithm SE.Dec takes a key s∈$\mathcal{K}$ and a ciphertext C to return a message m∈($\mathcal{M}$ ∪ {⊥}) where ⊥ denotes an error symbol. We write m←SE.Dec(s, C) for the operation of executing SE.Dec on s and C, letting m denote the output message.

Hash Functions. We further use hash functions $\mathcal{H}$: $\mathcal{K}$ × $\mathcal{D}$ → $\mathcal{R}$, where $\mathcal{H}$ denotes a family of hash functions and a specific instance is selected by choosing a hash key hk $\xleftarrow{r}$ $\mathcal{K}$. A hash computation for input x is denoted as h $\mathcal{H}$ (hk, x). For our constructions, we use a hash function which is (weakly) collision resistant, pseudo-random and hard to invert (one-way).

Decisional Diffie-Hellman Groups. The second construction below is based on the Decisional Diffie-Hellman assumption. We define a Decisional Diffie-Hellman parameter generator as a polynomial-time algorithm DDHgen which, on input a security parameter λ, generates an integer p along with the description of a cyclic group $\mathbb{G}$=⟨g⟩ of order p.

Privacy of Key-Evolving DDM Schemes. The main goal of DDM is to achieve privacy for data values, ensuring that an adversary cannot gain information about the masked values and cannot link them to input data masked in past epochs. We refer to three indistinguishability-based notions for the privacy of masked values, and one notion ruling out that an adversary may reverse the masking and recover the input value from a masked one, as follows.

IND-HOCH: Indistinguishability with Honest Owner and Corrupted Host. This is the most basic security criterion, focusing on the key-evolving dynamic aspect of DDM. It considers the owner (data-provider) to be honest and permits corruption of the host (data user) during the interaction. The adversary gains access to the updating values for all epochs following the compromise and yet, it should (roughly speaking) not be able to distinguish values masked before the corruption.

IND-COHH: Indistinguishability with Corrupted Owner and Honest Host. Modelling a corruption of the owner (data-provider) at some point in time, the adversary learns the masking key of the compromised epoch and all secrets of the owner. Subsequently, the adversary may take control of the owner, but should not learn correspondence between values masked before the corruption. The host (data-user) is assumed to remain (mostly) honest.

IND-COTH: Indistinguishability with Corrupted Owner and Transiently Corrupted Host. As a refinement of the first two notions, the adversary can transiently corrupt the host (data-user) during multiple epochs according to its choice, and it may also corrupt the owner (data-provider) once. The adversary learns the updating values of the specific epochs where it corrupts the host, and learns the masking key of the epoch where it corrupts the owner. Data values masked prior to exposing the owner's secrets should remain unlinkable.

Non-Reversibility: This notion models the scenario where the owner (data-provider) is corrupted right at the first epoch and the adversary therefore learns all secrets. Yet, the masking operation should be one-way in the sense that observing a masked value does not give the adversary an advantage for guessing the corresponding input from the input space.

Figure 5:
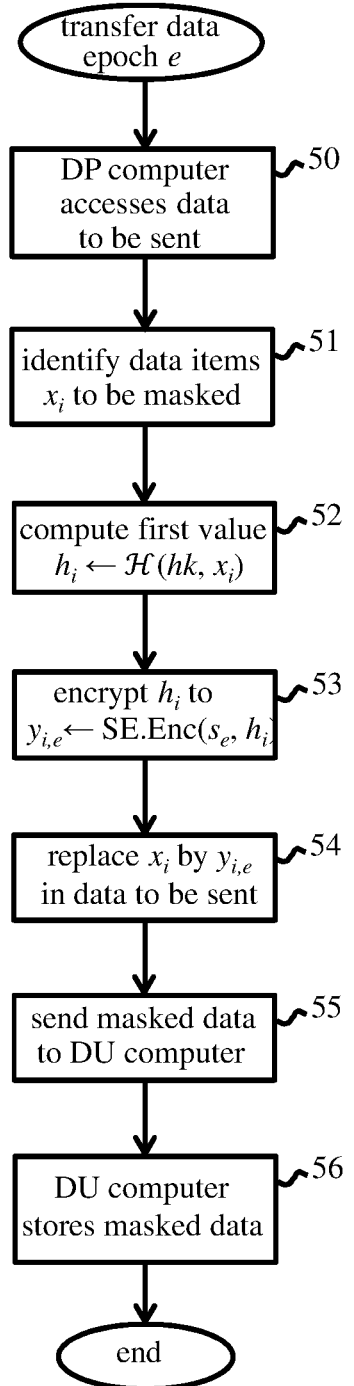
FIG. 5 indicates more detailed steps performed in an embodiment of the data masking system.
Figure 6:
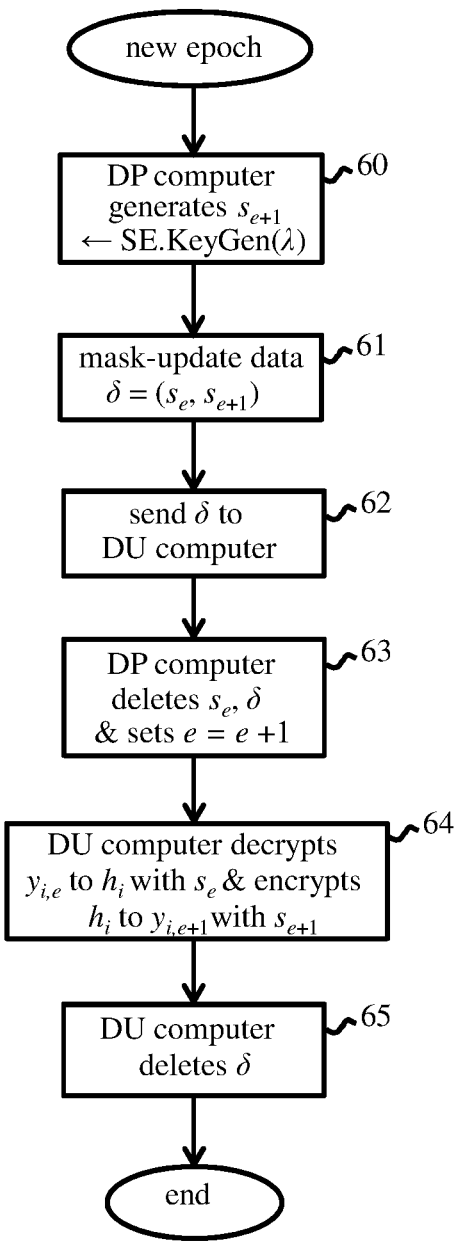
FIG. 6 further indicates more detailed steps performed in an embodiment of the data masking system.

FIGS. 5 and 6 indicate operation of system 1 with a key-evolving data masking scheme $DDM_{SE}$ based on a deterministic symmetric encryption scheme SE=(SE.KeyGen, SE.Enc; SE.Dec) and a family of collision-resistant keyed hash functions $\mathcal{H}: \mathcal{K} \times \mathcal{D} \to \mathcal{R}$. In this construction, the masking key $k_e$ for each epoch e comprises a distinct, random symmetric key $s_e$ for the encryption scheme SE and a long-term (fixed) secret hash key hk of the data-provider. The initial masking key $k_0=(s_0, hk)$ for epoch e=0 is generated by DP computer 2 in a set-up operation by computing $s_0 \xleftarrow{r} SE.KeyGen(\lambda)$ and choosing $hk \xleftarrow{r} \mathcal{K}$.

Referring first to the data transfer procedure of FIG. 5, steps 50 and 51 correspond respectively to steps 30 and 31 of FIG. 3. In step 52, for each data item $x_i$ to be masked, DP computer 2 computes the first value $h_i$ by applying the hash function $\mathcal{H}$ to that $x_i$ and the secret hash key hk, i.e. $h_i \leftarrow \mathcal{H}(hk, x_i)$. In step 53, DP computer 2 produces the masked data item $y_{i,e}$ by encrypting the hash value $h_i$ via the encryption scheme SE using the encryption key $s_e$ for the current epoch e, i.e. $y_{i,e} \leftarrow SE.Enc(s_e, h_i)$. Subsequent steps 54 to 56 correspond to steps 34 to 36 of FIG. 3.

The update process of FIG. 6 is performed on expiry of each current epoch e. In step 60, DP computer 2 generates the new encryption key $s_{e+1}$ for the next epoch as $s_{e+1} \xleftarrow{r} SE.KeyGen(\lambda)$. The mask-update data produced in step 61 comprises the current encryption key $s_e$ and the new encryption key $s_{e+1}$, i.e. $=(s_e, s_{e+1})$. After sending δ to DU computer 3 in step 62, the DP computer deletes $s_e$ and δ, and updates the epoch count e, in step 63. The new encryption key $s_{e+1}$ thus becomes the current encryption key $s_e$ for data transfer in the new epoch. On receiving the mask-update data δ=$(s_e, s_{e+1})$, in step 64 the DU computer 3 re-keys the masked data stored in database 6. Re-keying is achieved by: (a) decrypting each masked data item $y_{i,e}$, using the current encryption key $s_e$, via the decryption algorithm SE.Dec to obtain the first value $h_i$; and (b) re-encrypting the first value $h_i$ via the encryption algorithm SE.Enc using the new encryption key $s_{e+1}$, thus obtaining $y_{i,e+1}$. The DU computer then deletes the mask-update data δ in step 65, and the update process is complete.

The above construction can be defined in terms of algorithms of a key-evolving DDM scheme as follows.

$DDM_{SE}.setup(\lambda)$.

(a) Run $s_0 \xleftarrow{r} SE.KeyGen(\lambda)$ to obtain a symmetric encryption key $s_0$.

(b) Randomly pick a hash key $hk \xleftarrow{r} \mathcal{K}$.

(c) Let $k_0 \leftarrow (s_0, hk)$ and par=⊥. Output (par, $k_0$)

$DDM_{SE}.next(par, e, k_e)$.

(a) Parse $k_e$ as $(s_e, hk)$.

(b) Run $s_{e+1} \xleftarrow{r} SE.KeyGen(\lambda)$ to obtain a symmetric encryption key $s_{e+1}$.

(c) Let $k_{e+1} \leftarrow (s_{e+1}, hk)$ and let $\delta_{e+1}=(s_e, s_{e+1})$ (d) Output $(k_{e+1}, \delta_{e+1})$.

$DDM_{SE}.mask(par, x_i, e, k_e)$.

(a) Parse $k_e$ as $(s_e, hk)$.

(b) Compute the value $y_{i,e} \leftarrow SE.Enc(s_e, \mathcal{H}(hk, x_i))$.

(c) Output $y_{i,e}$.

$DDM_{SE}.upd(y_{i,e}, \delta_{e+1})$.

(a) Parse $\delta_{e+1}$ as $(s_e, s_{e+1})$.

(b) Compute the value $y_{i,e+1} \leftarrow SE.Enc(s_{e+1}, SE.Dec(s_e, y_e))$.

(c) Output $y_{i,e+1}$.

The foregoing construction gives an efficient DDM scheme achieving the IND-HOCH and IND-COHH security notions as well as the non-reversibility requirement.

FIGS. 7 and 8 indicate operation of system 1 with a key-evolving data masking scheme $DDM_{DL}$ based on a discrete logarithm assumption where the update is performed in a proxy re-encryption manner. This scheme again uses a family of collision-resistant keyed hash functions, $\mathcal{H}: \mathcal{K} \times \mathcal{D} \to \mathcal{R}$, and a deterministic encryption scheme. In this scheme, however, the mask-update data comprises a predetermined function δ of the current and new encryption keys $s_e$, $s_{e+1}$, and the encryption scheme comprises an algorithm Enc(k, X) for encrypting a value X under an encryption key k such that:

$Enc(\delta, (Enc(s_e, X))=Enc(s_{e+1}, X)$.

It follows that masked data items can be updated by encrypting each masked data item via the algorithm Enc(k, X) using the encryption key k=δ.

As before, the masking key $k_e$ for each epoch e comprises a random epoch-specific key $s_e$ and a long-term hash key hk of the data-provider. The initial masking key $k_0=(s_0, hk)$ for epoch e=0 is generated by DP computer 2 in a set-up operation. In this example, the key $s_0$ is generated by randomly choosing an exponent $s_0 \xleftarrow{r} \mathbb{Z}_p$, where $\mathbb{Z}_p$ is the group of integers modulo p. The hash key is generated as before by choosing $hk \xleftarrow{r} \mathcal{K}$.

In the data transfer procedure of FIG. 7, steps 70 to 72 correspond respectively to steps 50 to 52 of FIG. 5. In step 73 here, DP computer 2 produces the masked data item $y_{i,e}$ by encrypting the hash value $h_i$ for a data item $x_i$, using the encryption key $s_e$, via the algorithm $Enc(s_e, X) = X^{s_e}$, i.e. $y_{i,e} \leftarrow (h_i)^{s_e}$. Subsequent steps 74 to 76 correspond to steps 54 to 56 of FIG. 5. In the update process of FIG. 8, DP computer 2 generates the new encryption key $s_{e+1}$ in step 80 as $s_{e+1} \xleftarrow{r} \mathbb{Z}_p$. The mask-update data is produced in step 81 as a quotient of the current and new encryption keys: $\delta = s_{e+1}/s_e$. After sending δ to DU computer 3 in step 82, the DP computer deletes $s_e$ and δ, and updates the epoch count e, in step 83. The new encryption key $s_{e+1}$ thus becomes the current encryption key $s_e$ for data transfer in the new epoch. On receiving the mask-update data $\delta = s_{e+1}/s_e$, in step 84 the DU computer 3 re-keys the masked data in database 6 by encrypting each masked data item $y_{i,e}$ via the algorithm Enc(k, X) using the encryption key k=δ. Hence, $$Enc(\delta, y_{i,e}) = (y_{i,e})^\delta = (h_i)^{\frac{s_e \cdot s_{e+1}}{s_e}} = (h_i)^{s_{e+1}},$$

whereby the masked data item is updated into $y_{i,e+1}$. The DU computer deletes the mask-update data δ in step 85, and the update process is complete.

The second construction can be defined in terms of algorithms of a key-evolving DDM scheme as follows.

$DDM_{DL}.setup(\lambda)$.

(a) Randomly pick an exponent $s_0 \xleftarrow{r} \mathbb{Z}_p$, and a hash key $hk \xleftarrow{r} \mathcal{K}$.

(c) Let $k_0 \leftarrow (s_0, hk)$ and par=$(\mathbb{G}, p, g, \mathcal{H})$. Output (par, $k_0$)

$DDM_{DL}.next(par, e, k_e)$.

(a) Parse $k_e$ as $(s_e, hk)$.

(b) Randomly pick an exponent $s_{e+1} \xleftarrow{r} \mathbb{Z}_p$, (c) Let $k_{e+1} \leftarrow (s_{e+1}, hk)$ and let $\delta_{e+1}=s_{e+1}/s_e$.

(d) Output $(k_{e+1}, \delta_{e+1})$.

$DDM_{DL}.mask(par, x_i, e, k_e)$.
(a) Parse $k_e$ as $(s_e, hk)$.
(b) Compute $y_{i,e}$ $(\mathcal{H}(hk,x_i))^{s_e}$
(c) Output $y_{i,e}$.

$DDM_{SE}.upd(y_{i,e},\delta_{e+1})$.
(a) Compute $y_{i,e+1} \leftarrow (y_{i,e})^{\delta_{e+1}}$.
(b) Output $y_{i,e+1}$.

The second construction gives an exceptionally secure and efficient DDM scheme achieving non-reversibility and all three security notions IND-HOCH, IND-COHH and IND-COTH. To update masked values, the data-user is not given the encryption keys per se but only the quotient of the current and new exponents. While this allows the data-user to consistently update the masked data, it does not reveal the inner hash in the update process and guarantees unlinkability of masked values across epochs, thus satisfying the strongest notion of IND-COTH security.

It will be seen that the above embodiments offer dynamic data masking schemes which are based on provably-secure cryptography, and support key evolution with efficient and consistent re-keying of masked data in an untrusted domain.

Many changes and modifications can of course be made to the exemplary embodiments described. For example, alternative constructions for algorithms Enc(k, X) and mask-update values δ satisfying Enc(δ, (Enc($s_e$, X))=Enc($s_{e+1}$, X) may be envisaged by those skilled in the art. Other one-way functions F may be used in the inner masking layer. Also, while use of a static secret key hk in this layer adds to security, in some embodiments the one-way function may be applied to a data item $x_i$ without a static key hk. Use of the static key may be of less concern, for instance, in the embodiments which do not reveal the inner hash $h_i$.

While the first construction above uses a symmetric encryption scheme, an asymmetric encryption scheme could be used if desired, albeit with loss of efficiency. With asymmetric encryption, different keys of a key-pair are used for encryption and decryption, whereby the mask-update data would contain the decryption key for a current epoch and the encryption key for the next epoch. Further, while the specific examples describe dynamic data masking schemes, the principles described may be applied to advantage in static data masking scenarios.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-program product for data masking, the computer-program product comprising a non-transitory computer-readable storage medium having program instructions embodied therein, the program instructions being executable by a data-provider computer to cause the data-provider computer to:
   access data to be sent to a data-user computer;
   produce masked data by, for at least one predetermined data item in the data to be sent, applying a one-way function to that data item to produce a first value, producing a masked data item by encrypting said first value via a deterministic encryption scheme using a current encryption key for a current epoch, and replacing that data item by the masked data item;
   send the masked data to the data-user computer; and
   on expiry of said current epoch, generate a new encryption key for said deterministic encryption scheme in a new epoch, produce mask-update data, dependent on the current and new encryption keys, and send the mask-update data to the data-user computer;
   wherein said mask-update data permits updating, at the data-user computer, of masked data items produced with the current encryption key into masked data items produced with the new encryption key, wherein said mask-update data comprises a predetermined function δ of the current and new encryption keys, and wherein said deterministic encryption scheme comprises an algorithm Enc(k, X) for encrypting a value X under an encryption key k such that Enc(δ, (Enc($s_e$, X))=Enc($s_e$+i, X), where $s_e$ is the current encryption key and $s_{e+1}$ is the new encryption key.

2. The computer-program product as claimed in claim 1, said program instructions being further executable to cause the data-provider computer to perform the steps of generating said new encryption key, producing said mask-update data, and sending the mask-update data to the data-user computer, on expiry of said new epoch and each of subsequent new epochs.

3. The computer-program product as claimed in claim 1, said program instructions being executable such that:
   said one-way function is applied to said data item and a secret key of the data provider computer to produce said first value.

4. A computer-program product for managing masked data, the computer-program product comprising a non-transitory computer-readable storage medium having program instructions embodied therein, the program instructions being executable by a data-user computer to cause the data-user computer:
   in response to receipt from a data-provider computer of masked data containing at least one masked data item produced by applying a one-way function to a data item to produce a first value and encrypting the first value via a deterministic encryption scheme using a current encryption key for a current epoch, to store the masked data;
   in response to receipt from the data-provider computer, on expiry of said current epoch, of mask-update data which is dependent on said current encryption key and a new encryption key for said deterministic encryption scheme in a new epoch, to use the mask-update data to update each masked data item, produced with said current encryption key, in the stored masked data into a masked data item produced with the new encryption key, wherein said mask-update data comprises a predetermined function δ of the current and new encryption keys, and said encryption scheme comprises an algorithm Enc(k, X) for encrypting a value X under an encryption key k such that Enc(δ, (Enc($s_e$, X))=Enc($s_{e+1}$, X), where $s_e$ is the current encryption key and $s_{e+1}$ is the new encryption key.

5. The computer-program product as claimed in claim 4, said program instructions being further executable to cause the data-user computer:
   in response to receipt from the data-provider computer, on expiry of each of said new epoch and subsequent new epochs, of mask-update data which is dependent on the encryption key for that epoch and a new encryption key for said deterministic encryption scheme in the next epoch, to use that mask-update data to update each masked data item in the stored masked data into a masked data item produced with the new encryption key.

6. The computer-program product as claimed in claim 4 wherein said program instructions being executable to cause the data-user computer to use the mask-update data to update each masked data item in the stored masked data by encrypting that masked data item via said algorithm Enc(k, X) using the encryption key k=$\delta$.

7. A system comprising a data-provider computer and a data-user computer operable for communication via a network, wherein:
the data provider computer is adapted to: access data to be sent to a data-user computer; produce masked data by, for at least one predetermined data item in the data to be sent, applying a one-way function to that data item to produce a first value, producing a masked data item by encrypting said first value via a deterministic encryption scheme using a current encryption key for a current epoch, and replacing that data item by the masked data item; send the masked data to the data-user computer; and, on expiry of said current epoch, to generate a new encryption key for said deterministic encryption scheme in a new epoch, produce mask-update data, dependent on the current and new encryption keys, and to send the mask-update data to the data-user computer, wherein said mask-update data comprises a predetermined function $\delta$ of the current and new encryption keys; and said encryption scheme comprises an algorithm Enc(k, X) for encrypting a value X under an encryption key k such that Enc($\delta$, (Enc($s_e$, X))=Enc($s_{e+1}$, X), where $s_e$ is the current encryption key and $s_{e+1}$ is the new encryption key; and
the data-user computer is adapted, in response to receipt from the data-provider computer of said masked data, to store the masked data, and in response to receipt from the data-provider computer of said mask-update data, to use the mask-update data to update each masked data item, produced with said current encryption key, in the stored masked data into a masked data item produced with the new encryption key.

8. The system as claimed in claim 7 wherein:
the data-provider computer is further adapted to perform the steps of generating said new encryption key, producing said mask-update data, and sending the mask-update data to the data-user computer, on expiry of said new epoch and each of subsequent new epochs; and
the data-user computer is further adapted, in response to receipt from the data-provider computer of the mask-update data on expiry of each of said new epochs, to use that mask-update data to update each masked data item in the stored masked data into a masked data item produced with the new encryption key.

9. The system as claimed in claim 7 wherein:
the data-provider computer is adapted such that: said one-way function is applied to said data item and a secret key of the data provider computer to produce said first value; and
the data-user computer is adapted to use the mask-update data to update each masked data item in the stored masked data by encrypting that masked data item via said algorithm Enc(k, X) using the encryption key k=$\delta$.

* * * * *